Feb. 25, 1941.   F. O. CLAYTOR   2,233,380
ATTACHMENT FOR SMALL ANIMAL TRAPS
Filed May 29, 1940
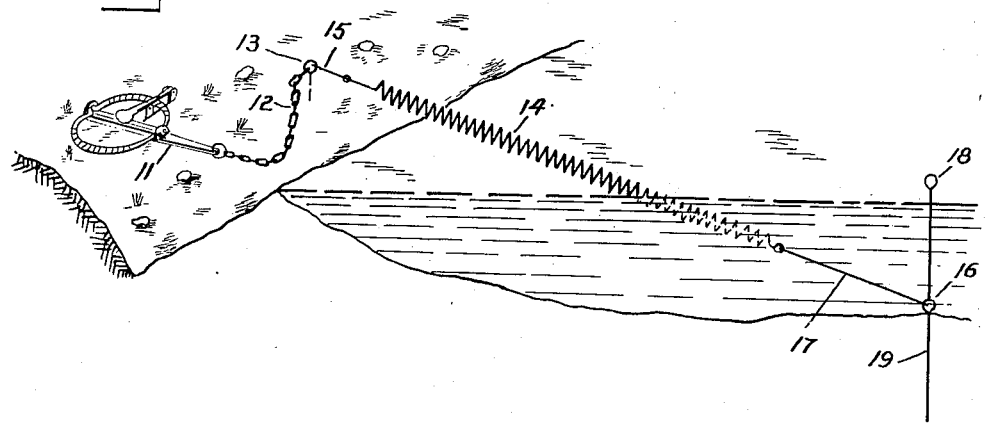
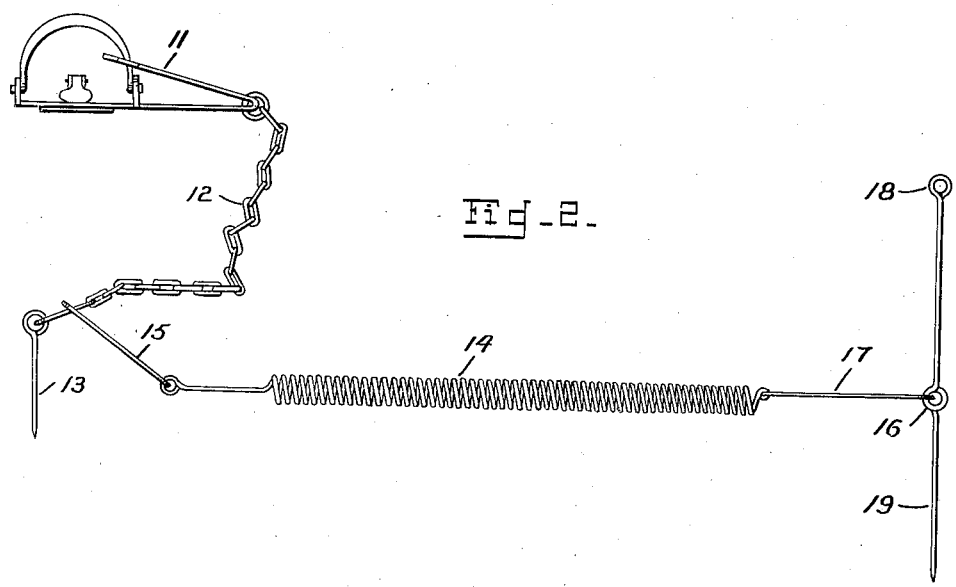
Inventor
Fowler O. Claytor
Attorney Patented Feb. 25, 1941

2,233,380

UNITED STATES PATENT OFFICE 2,233,380

ATTACHMENT FOR SMALL ANIMAL TRAPS

Fowler O. Claytor, Warren, Ark., assignor of one-half to Kim Hedrick, trustee, Warren, Ark.

Application May 29, 1940, Serial No. 337,933

4 Claims. (Cl. 43—96)

This invention relates to jaw traps of the type commonly used for trapping small fur-bearing animals, such as the fox, mink, muskrat, opossum, otter, raccoon and skunk, of which many thousands are caught annually along the streams and lakes throughout the eastern and central part of the United States.

The object of the invention is to provide means for use with traps set along the banks of water courses for drawing the catch under water immediately upon being caught, thereby drowning the catch before escape can be made by pulling or chewing out or wringing off as not infrequently happens in trapping such animals.

A further object of the invention is to provide means for concealing the catch and for locating its position in the water so that it may be readily recovered.

Other objects and advantages of the invention appear in connection with the following description of an illustrative set on the bank of a stream comprising a jaw trap of usual type and a drown spring for connecting the trap chain to a stake in the stream, as shown in Fig. 1 of the drawing in perspective.

Fig. 2 is a side view of the invention showing it applied to a trap in the sprung or gripping position.

Referring to the drawing, the usual type of spring jaw trap 11 is provided with a chain 12 for attaching it to a pin or stake 13 which may be driven into the ground or into a stump or log for preventing the catch from making off with the trap. My attachment comprises a coil spring 14, which I term a drown spring and which may be from two to three feet or so in length, secured at one end to the trap chain 12 by a ring 15, snap hook or the like, and tied to a stake 16 by means of a tie wire 17 or other suitable means. The stake may be made of metal and is advantageously provided with a handle or loop 18 at one end and a point 19 at the other end, to permit it to be forced into and withdrawn from the bed of a stream or shallow body of water.

In making a set, the trapper first locates the tracks of an animal that it is desired to catch, and sets the trap near the bank of a body of water in the usual way, except that the pin or stake 13 is not driven in as firmly as would ordinarily be required in order to hold the catch. The stake 16 is driven into the bottom of the body of water at some five or six feet or more from the bank, and the drown spring is stretched between the trap stake 13 and the stake 16 in the water, and tied to the latter by means of a wire tie 17 of suitable length to stretch the spring to about double its normal length. A spool of soft wire may be carried by the trapper for this purpose, as each set is likely to require a different length of wire. The trap and chain may be concealed with leaves, grass, snow or other means customarily used.

Upon the springing of the trap to grasp the animal's foot when it engages the trigger pedal, the frightened animal will give a leap and try to make away, thus loosening the stake 13, whereupon the drown spring 14 will jerk the animal into the water before it can recover its footing. Once in the water, the weight of the trap and the tension of the spring will soon tire the animal of swimming, and it will sink and drown before it can free itself from the trap. Even where the depth of the water is only a few inches the animal soon tires of holding its trapped foot up and is unable to chew it off or wring it out.

The exposed handle end 18 of the stake 16 enables the catch to be located and readily recovered by pulling the stake, drown spring and trap out of the water, and yet is too inconspicuous to attract the attention of passers by, and the catch being beneath the water will not cause prowling dogs to bay and perhaps mouth the catch and injure the fur or even release it from the trap and make away with it.

The drown spring may be used for a dry set with good results, as it interposes a yieldable resistance to any sudden pull or jerk upon the trap which the trapped animal may make to free itself, and assists in tiring the animal to the point that it gives up, although the primary purpose of the drown spring is to hold the catch in the water.

Having described what I consider to be the best form of my invention, what I claim is as follows:

1. A drown spring attachment for a jaw trap provided with a chain and stake comprising a long coil spring and means at one end for attaching it to the stake end of the chain of a trap, a stake adapted to be driven into the bed of a stream, and a connection between said stake and the other end of said drown spring.

2. A mode of trapping along the edge of a body of water which includes connecting a long coiled spring under tension between the trap chain or stake and a stake set in the water, and adjusting the trap stake to be jerked loose by the struggling animal promptly upon being caught, whereby the trap and catch will be pulled into the water before the catch can escape from the trap.

3. A trap attachment comprising a long coil spring and means for attaching it to the chain of a trap at the stake end, a stake adapted to be driven into the bed of a stream, and a connection between said stake and said drown spring for stretching the latter when the trap is set and staked on the bank, said stake having means at its upper end for locating and withdrawing it from the stream bed.

4. A trap attachment for animal traps provided with a chain and stake comprising a long coil spring, means for securing one end of said spring to the trap stake, and means at the other end of said spring to be secured to a fixed support, whereby said spring may be maintained in tension when the trap is set.

FOWLER O. CLAYTOR.